United States Patent [19]

Christian

[11] Patent Number: 5,392,880
[45] Date of Patent: Feb. 28, 1995

[54] TIRE CLOCK FOR TANDEM WHEELS

[76] Inventor: Melvin L. Christian, P.O. Box 247, Ukiah, Oreg. 97880

[21] Appl. No.: 186,319

[22] Filed: Jan. 25, 1994

[51] Int. Cl.⁶ ............................................. B60T 1/04
[52] U.S. Cl. ..................................... 188/32; 188/2 R
[58] Field of Search ........................... 188/4 R, 32, 74

[56] References Cited

U.S. PATENT DOCUMENTS

| | | | |
|---|---|---|---|
| 3,695,394 | 10/1972 | Carpenter | 188/32 |
| 4,694,936 | 9/1987 | Jackson | 188/74 |
| 4,828,076 | 5/1989 | Fox | 188/4 R |
| 4,934,489 | 6/1990 | Jackson | 188/32 |

*Primary Examiner*—Robert J. Oberleitner
*Assistant Examiner*—Chris Schwartz

[57] ABSTRACT

A tire chock for tandem wheels, for preventing unwanted movement of tandem wheel vehicles. The tire chock for tandem wheels comprises upper and lower opposing wedges which are sized for wedging engagement with facing tire tread surfaces of the tandem wheels to stop wheel rotation. Each wedge has arcuate diverging engagement surfaces generally conforming to the curvature of the tire tread surfaces. A threaded bar joins the upper and lower wedges and connects thereto so that rotation of the bar moves the wedges toward and away from each other. Also included is a handle connected to the bar for rotating the bar for moving the wedges toward and away from each other. There is also a member for locking the bar against rotation which comprises a first tab fixedly radially connected to the threaded bar and a second cooperating tab fixedly connected to the upper wedge. Both tabs have a lateral hole wherethrough the shackle of a padlock may be inserted simultaneously whereby preventing rotation of the threaded bar.

2 Claims, 4 Drawing Sheets

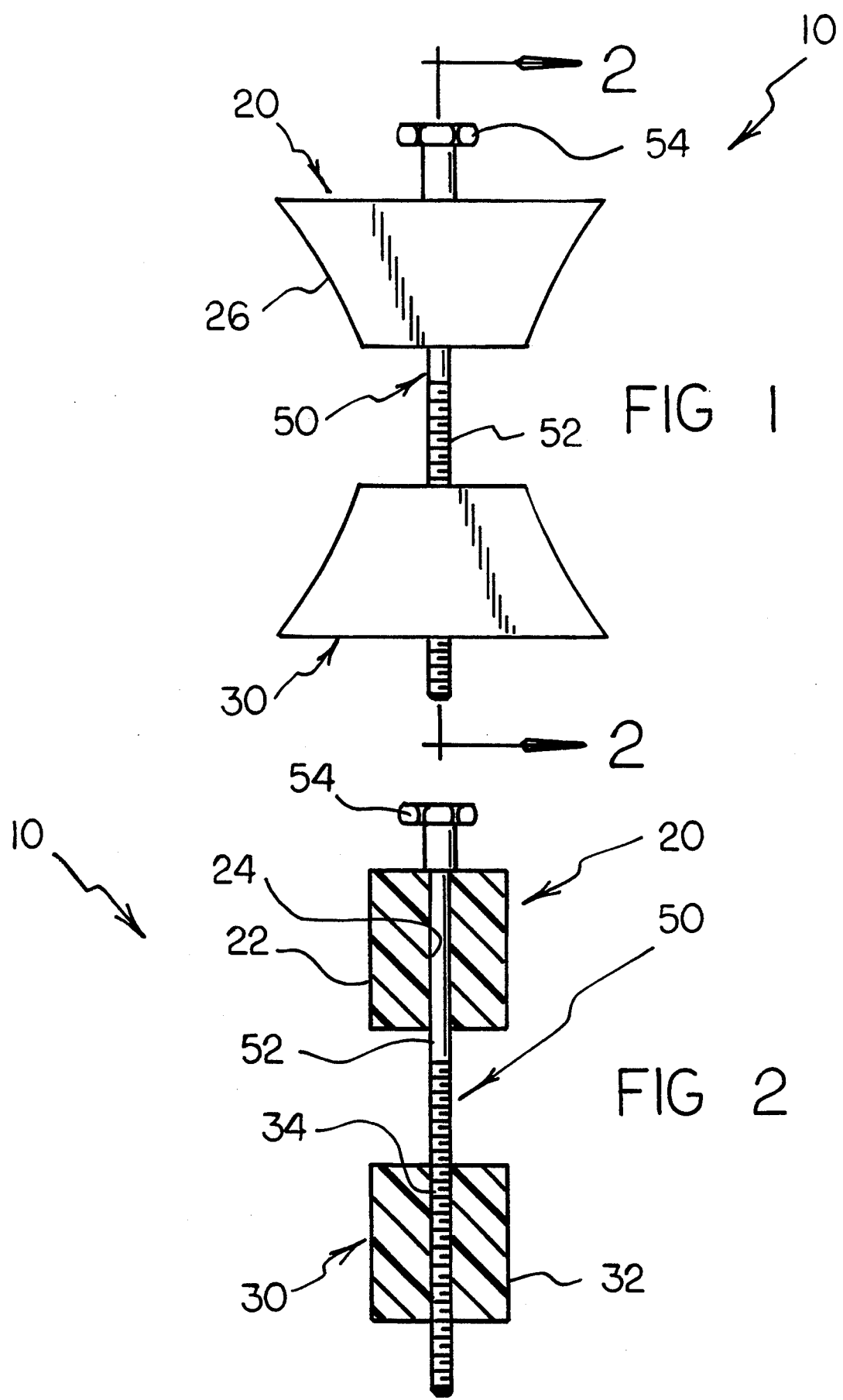

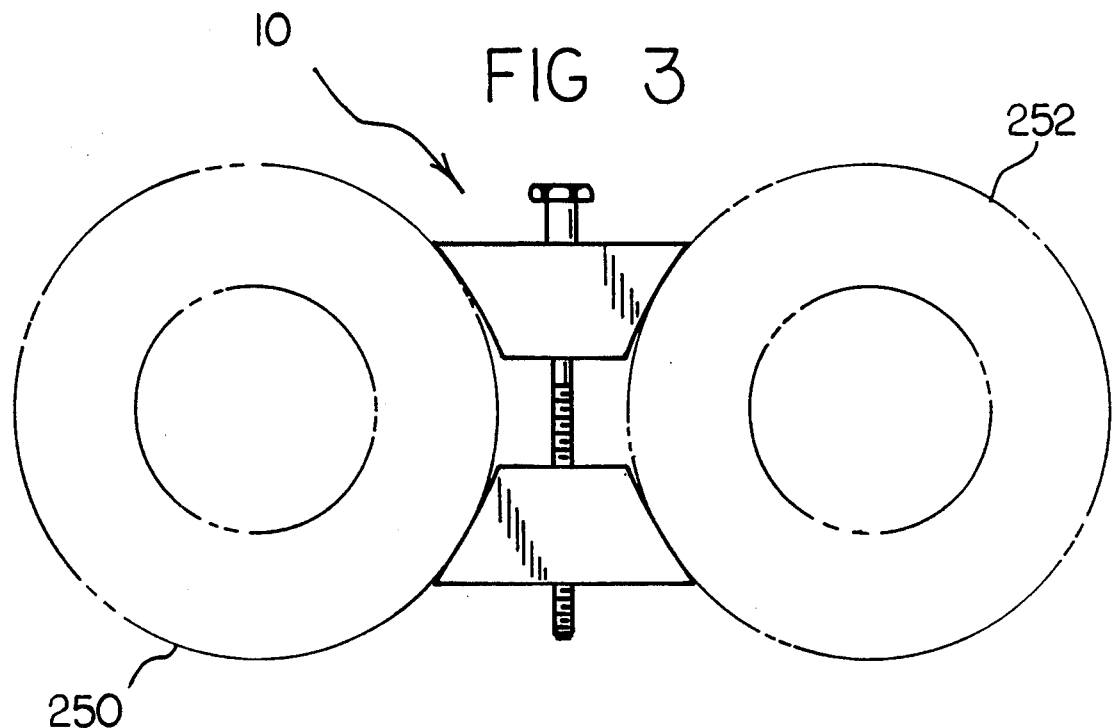
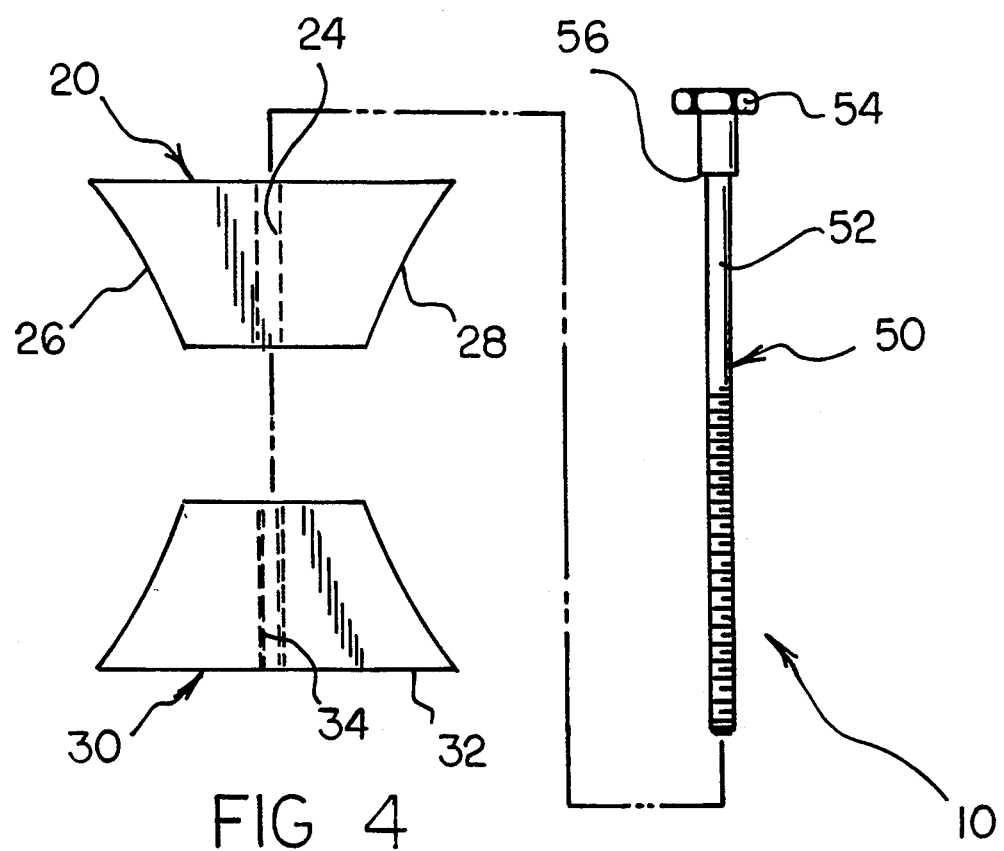

5,392,880

TIRE CLOCK FOR TANDEM WHEELS

BACKGROUND OF THE INVENTION

1. Field of the Invention

The present invention relates to vehicle wheel chocks and more particularly pertains to tire chock for tandem wheels which may be adapted for preventing unwanted movement of tandem wheel vehicles such as trucks, semitrailers, recreational vehicles, or the like by frictionally engaging facing tire tread surfaces with an adjustable wedge disposed therebetween to stop wheel rotation.

2. Description of the Prior Art

The use of vehicle wheel chocks is known in the prior art. More specifically, vehicle wheel chocks heretofore devised and utilized for the purpose of preventing a vehicle from rolling along a supporting surface are known to consist basically of familiar, expected and obvious structural configurations, notwithstanding the myriad of designs encompassed by the crowded prior art which have been developed for the fulfillment of countless objectives and requirements.

The present invention is directed to improving devices for preventing unwanted movement of tandem wheel vehicles such as trucks, semitrailers, recreational vehicles, or the like by frictionally engaging facing tire tread surfaces with an adjustable wedge disposed therebetween to stop wheel rotation in a manner which is safe, secure, and economical.

For example, U.S. Pat. No. 4,934,489 to Jackson discloses a tandem tire brake formed by upper and lower wedge members centrally joined by a threaded shaft moving the wedge members toward and away from each other for impinging confronting tread surfaces of tandem tires when disposed therebetween. Telescoping members adjustably extending between panels forming the wedge members permit fore and aft adjustment of the spacing between the wedge forming panels prior to installation of the locking device on the tires of a particular vehicle. Tire retaining flanges on the wedge members prevent lateral movement of the device in a direction parallel with the axes of tandem axles. The device shown is overly complex in its manner of fore and aft spacing adjustment in that it has numerous fasteners requiring adjustment and tightening, and also increasing potential for device failure. Additionally, the planar engagement surfaces of the wedge members provide little contact area for engaging the arcuate tire tread surfaces.

U.S. Pat. No. 4,694,936 to Jackson describes an exterior brake for tandem tires having upper and lower wedges joined by a bar threaded to the wedges. The bar is rotated to move the wedges together and apart and is locked against rotation by a padlock extending through a lock tab on the bar. The upper and lower wedges fit in wedging engagement between the upper and lower tread surfaces, respectively, of tandem tires. Tire retaining flanges and a tamper prevention skirt are provided on the wedges. Expansion pads to adapt the wedges to tires spaces further apart are also provided. The planar tire engagement surfaces of this device provide little contact area for engaging the arcuate tire tread surfaces. Moreover, the removable expansion pads add complexity and, given the often rapid pace of the work environment associated with their use, are likely to become separated from the main device and misplaced.

The prior art also discloses a tandem wheel chock as shown in U.S. Pat. No. 4,715,480 to Anderson which consists of dual opposing horizontal shoes pressing against the tires of the tandem wheels to prevent the wheels from rotating, the shoes being locked in position against the tires by a cam and lever action, and a vertically disposed wheel chock for tandem wheels disclosed in U.S. Pat. No. 5,158,158 to Balogh et al. which includes a pair of wedge-shaped members which can be moved toward and away from each other for engagement with the opposed curved tread surface of pneumatic tires on the tandem wheels. Neither of these two inventions teach a way to compensate for the wider spacing between tires encountered on some tandem wheel vehicles, nor can either of the devices be locked to prevent unauthorized use of the vehicle.

In this respect, the tire chock for tandem wheels according to the present invention substantially departs from the conventional concepts and designs of the prior art, and in so doing provides an apparatus primarily developed for the purpose of preventing unwanted movement of tandem wheel vehicles such as trucks, semitrailers, recreational vehicles, or the like by frictionally engaging facing tire tread surfaces with an adjustable wedge disposed therebetween to stop wheel rotation.

Therefore, it can be appreciated that there exists a continuing need for new and improved tire chocks for tandem wheels which can be used for preventing unwanted movement of tandem wheel vehicles such as trucks, semitrailers, recreational vehicles, or the like by frictionally engaging facing tire tread surfaces with an adjustable wedge disposed therebetween to stop wheel rotation. In this regard, the present invention substantially fulfills this need.

As illustrated by the background art, efforts are continuously being made in an attempt to develop devices for preventing a vehicle from rolling along a supporting surface. No prior effort, however, provides the benefits attendant with the present invention. Additionally, the prior patents and commercial techniques do not suggest the present inventive combination of component elements arranged and configured as disclosed and claimed herein.

The present invention achieves its intended purposes, objects, and advantages through a new, useful and unobvious combination of method steps and component elements, with the use of a minimum number of functioning parts, at a reasonable cost to manufacture, and by employing only readily available materials.

SUMMARY OF THE INVENTION

In view of the foregoing disadvantages inherent in the known types of vehicle wheel chocks now present in the prior art, the present invention provides an improved vehicle wheel chock construction wherein the same can be utilized for preventing unwanted movement of tandem wheel vehicles such as trucks, semitrailers, recreational vehicles, or the like by frictionally engaging facing tire tread surfaces with an adjustable wedge disposed therebetween to stop wheel rotation. As such, the general purpose of the present invention, which will be described subsequently in greater detail, is to provide a new and improved tire chock apparatus and method which has all the advantages of the prior art vehicle wheel chocks and none of the disadvantages.

The invention is defined by the appended claims with the specific embodiment shown in the attached drawings. For the purpose of summarizing the invention, the invention may be incorporated into a new and improved tire chock for tandem wheels for preventing unwanted movement of tandem wheel vehicles. The tire chock for tandem wheels comprises upper and lower opposing wedges which are sized for wedging engagement with facing tire tread surfaces of the tandem wheels to stop wheel rotation. Each wedge has arcuate diverging engagement surfaces generally conforming to the curvature of the tire tread surface. Further included is a threaded bar joining the upper and lower wedges and connected thereto so that rotation of the bar moves the wedges toward and away from each other. Also included is handle means connected to the bar for rotating the bar for moving the wedges toward and away from each other. There is also a means for locking the bar against rotation, The lock means comprises a first tab fixedly connected to the threaded bar. The first tab extends radially from the threaded bar and has a lateral hole therethrough wherethrough a shackle of a padlock may be inserted. The lock means further comprises a second tab having a lateral hole therethrough wherethrough the shackle of a padlock may be inserted. The second tab is fixedly connected to the upper wedge in cooperating alignment with the first tab such that the shackle of a padlock may be simultaneously inserted through the holes of both tabs whereby preventing rotation of the threaded bar.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In as much as the foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present invention. It should be realized by those skilled in the art that such equivalent methods and structures do not depart from the spirit and scope of the invention as set forth in the appended claims.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Therefore, it is an object of the present invention to provide an tire chock for tandem wheels for preventing unwanted movement of tandem wheel vehicles such as trucks, semitrailers, recreational vehicles, or the like by frictionally engaging facing tire tread surfaces with an adjustable wedge disposed therebetween to stop wheel rotation.

It is therefore an additional object of the present invention to provide a new and improved tire chock for tandem wheels which has all the advantages of the prior art vehicle wheel chocks and none of the disadvantages.

It is another object of the present invention to provide a new and improved tire chock for tandem wheels which may be easily and efficiently manufactured and marketed.

It is a further object of the present invention to provide a new and improved tire chock for tandem wheels which is of a durable and reliable construction.

An even further object of the present invention is to provide a new and improved tire chock for tandem wheels which is susceptible of a low cost of manufacture with regard to both materials and labor, and which accordingly is then susceptible of low prices of sale to the consuming public, thereby making such tire chocks for tandem wheels economically available to the buying public.

Still yet another object of the present invention is to provide a new and improved tire chock for tandem wheels which provides in the apparatuses and methods of the prior art some of the advantages thereof, while simultaneously overcoming some of the disadvantages normally associated therewith.

Still yet another object of the present invention is to provide a new and improved tire chock for tandem wheels for preventing theft of the vehicle by locking the wheels against rotation unless released by an authorized person.

Yet another object of the present invention is to provide a new and improved tire chock for tandem wheels that will function with a wide variety of tandem wheel vehicles without modification.

Even still another object of the present invention is to provide a new and improved tire chock for tandem wheels that has a minimum number of working parts for reliable operation under adverse road conditions.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention. The foregoing has outlined some of the more pertinent objects of this invention. These objects should be construed to be merely illustrative of some of the more prominent features and applications of the present invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a front elevational view of the wheel chock for tandem wheels.

FIG. 2 is a sectional view of the invention of FIG. 1 taken along the line 2—2.

FIG. 3 is a front elevational view of the present invention showing its manner of use.

FIG. 4 is an exploded view of the invention of FIG. 1 showing its component parts.

DESCRIPTION OF THE PREFERRED EMBODIMENT

Figure 5:
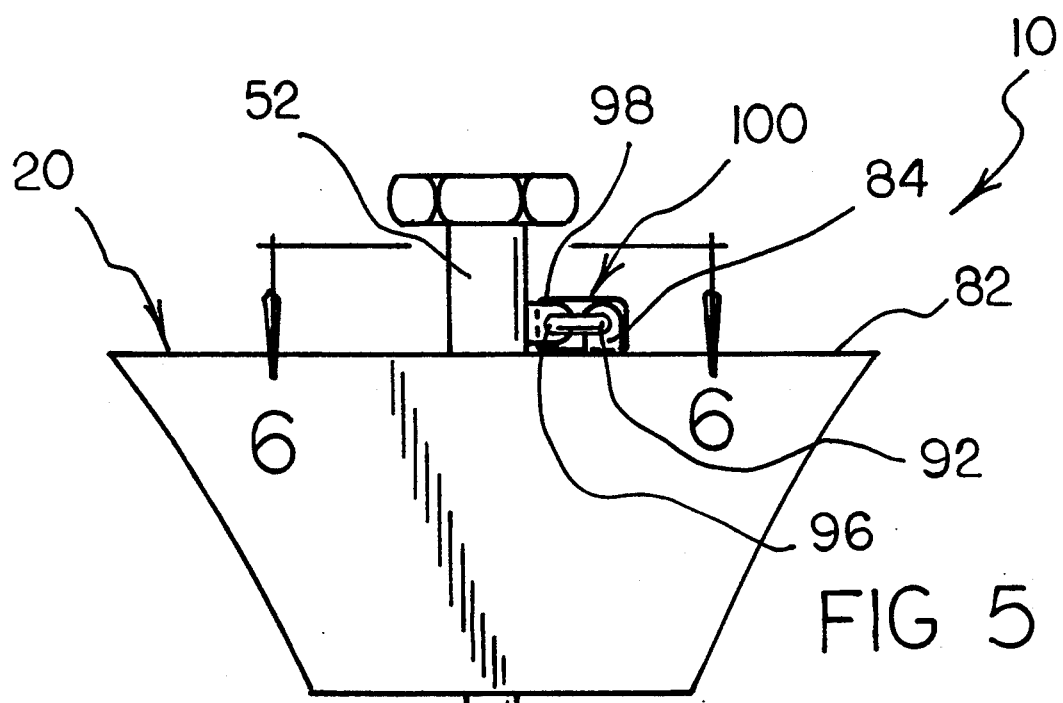
FIG. 5 is a partial front elevational view of an alternate embodiment of the present invention illustrating a locking means.

With reference now to the drawings, and in particular to FIG. 1 thereof, a new and improved tire chock for tandem wheels embodying the principles and concepts of the present invention and generally designated by the reference numeral 10 will be described.

From an overview standpoint, the tire chock for tandem wheels is adapted for use for preventing unwanted movement of tandem wheel vehicles such as trucks, semitrailers, recreational vehicles, or the like by frictionally engaging facing tire tread surfaces with an adjustable wedge disposed therebetween to stop wheel rotation. See FIG. 3.

With reference now to FIGS. 1–4 and more specifically, it will be noted that a new and improved tire chock for tandem wheels 10 for preventing unwanted movement of tandem wheel vehicles is shown. The tire chock for tandem wheels 10 comprises upper and lower opposing wedges 20 and 30 which are sized for wedging engagement with facing tire tread surfaces 250 and 252 of the tandem wheels to stop wheel rotation.

Each wedge 20 and 30 has arcuate diverging engagement surfaces 26 and 28 generally conforming to the curvature of the tire tread surfaces 250 and 252. Further included is a threaded bar 50 joining the upper and lower wedges 20 and 30 and connected thereto so that rotation of the bar 50 moves the wedges 20 and 30 toward and away from each other.

Figure 6:
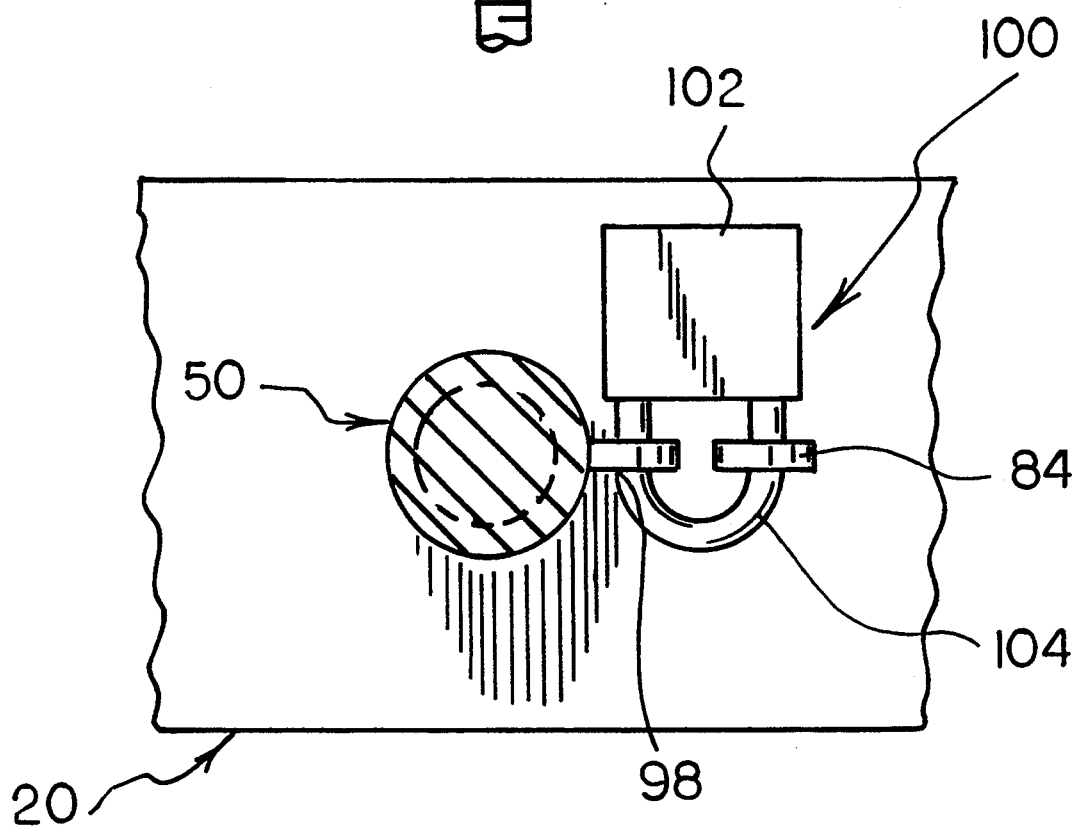
FIG. 6 is a detail view of the invention of FIG. 5 showing the locking means.

Also included is handle means 54 connected to the bar 50 for rotating the bar 50 for moving the wedges 20 and 30 toward and away from each other. As shown in FIGS. 5 and 6, there is also a means for locking the bar 50 against rotation. The lock means 100 comprises a first tab 98 fixedly connected to the threaded bar 50. The first tab 98 extends radially from the threaded bar 50 and has a lateral hole 96 therethrough wherethrough a shackle 104 of a padlock 102 may be inserted.

The lock means 100 further comprises a second tab 84 having a lateral hole 92 therethrough wherethrough the shackle 104 of a padlock 102 may be inserted. The second tab 84 is fixedly connected to the upper wedge 20 in cooperating alignment with the first tab 98 such that the shackle 104 of a padlock 102 may be simultaneously inserted through the holes 92 and 96 of both tabs 84 and 98 whereby preventing rotation of the threaded bar 50.

Figure 7:
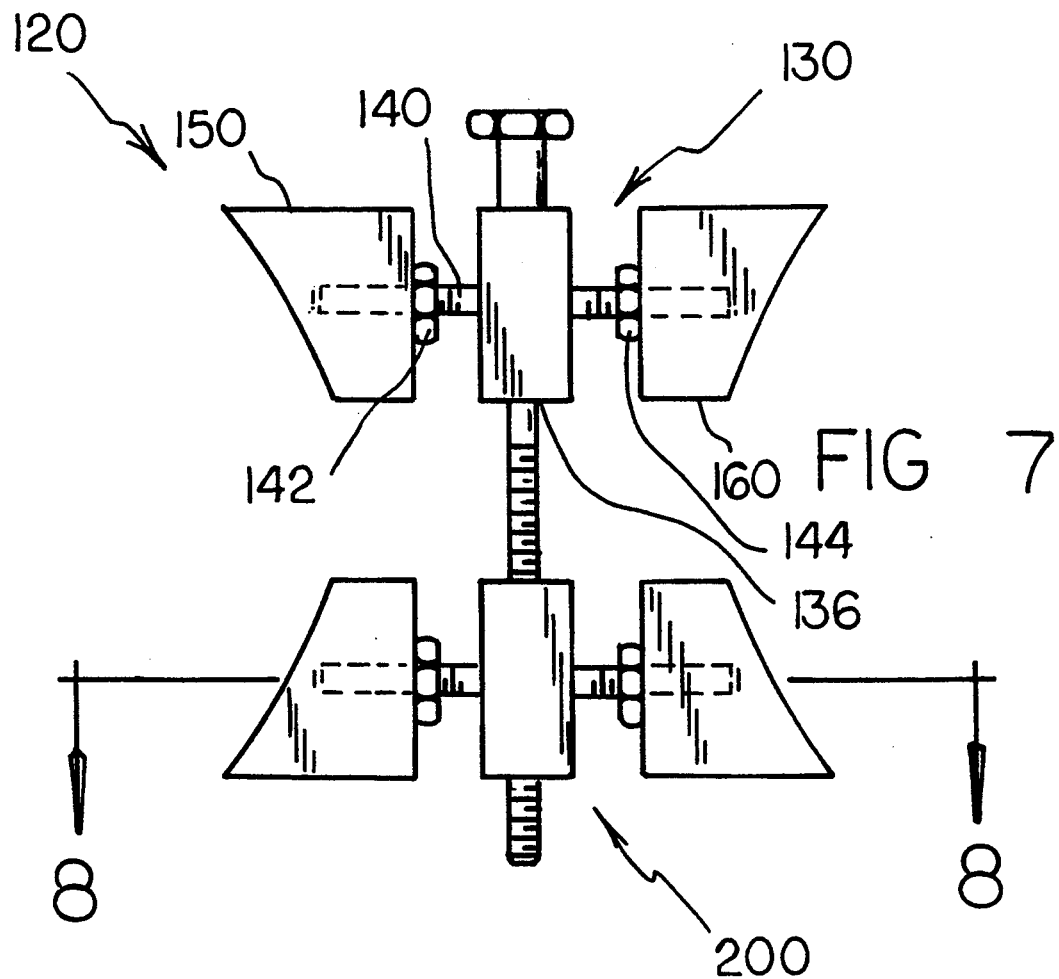
FIG. 7 is a front elevational view of an alternate embodiment of the present invention showing the wedge expansion means.
Figure 8:
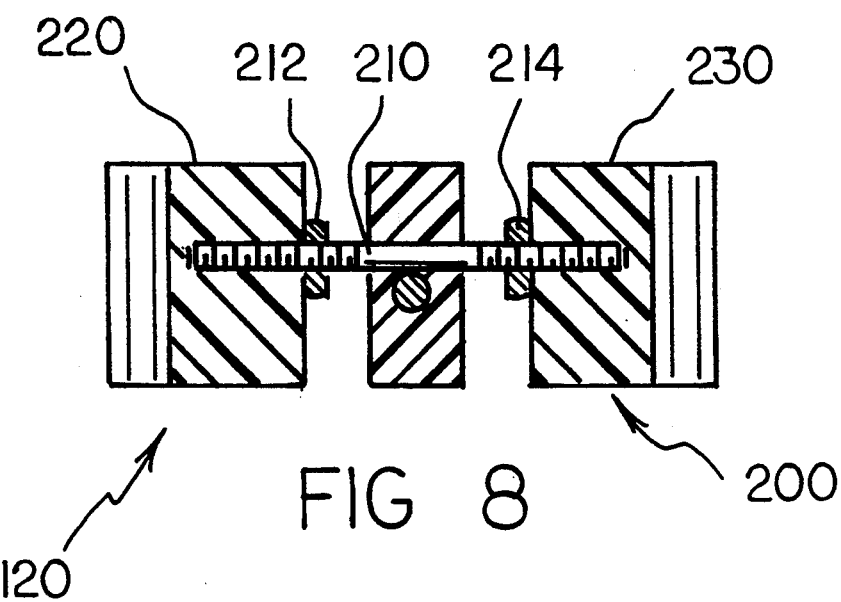
FIG. 8 is a sectional view of the invention of FIG. 7 taken along the line 8—8.

Referring additionally now to FIGS. 7 and 8, an alternate embodiment generally designated by the reference numeral 120 is shown wherein upper and lower wedges 130 and 200 include expansion means for changing the size of the wedges 130 and 200 to fit different tire configurations and for engaging tread surfaces of the different tire configurations. Since the expansion means of the upper and lower wedges 130 and 200 are functionally identical, only the upper wedge 130 expansion means will be described.

The expansion means comprises front and rear spaced opposing movable brake shoes 150 and 160 with a threaded bar 140 joining the front and rear shoes 150 and 160 and connected thereto so that rotation of the bar 140 moves the shoes 150 and 160 toward and away from each other. This movement is effected through the threads at the ends of the bar 140, as well as, the apertures in which they are positioned, being oppositely oriented, one a left hand thread and the other a right hand thread, a conventional arrangement. The expansion means also has a locknut 142 and 144 engagable with each shoe 150 and 160 to prevent unwanted movement of the shoes, the locknuts 142 and 144 being threadedly engaged with the threaded bar 140.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention. In as much as the present disclosure includes that contained in the appended claims as well as that of the foregoing description. Although this invention has been described in its preferred forms with a certain degree of particularity, it is understood that the present disclosure of the preferred form has been made only by way of example and numerous changes in the details of construction and combination and arrangement of parts may be resorted to without departing from the spirit and scope of the invention.

Now that the invention has been described,
What is claimed is:

1. A new and improved tire chock for tandem wheels for preventing unwanted movement of tandem wheel vehicles, the tire chock for tandem wheels comprising:
 upper and lower opposing wedges which are sized for wedging engagement with facing tire tread surfaces of the tandem wheels to stop wheel rotation, each wedge having arcuate diverging engagement surfaces generally conforming to the curvature of the tire tread surface;
 a threaded bar joining the upper and lower wedges and connected thereto so that rotation of the bar moves the wedges toward and away from each other;
 handle means connected to the bar for rotating the bar for moving the wedges toward and away from each other; and
 expansion means for the upper and lower wedges for changing the size of the wedges to fit different tire configurations and for engaging tread surfaces of the different tire configurations, the means comprising front and rear spaced opposing movable brake shoes and a threaded bar with opposite threads at its end joining the front and rear shoes and connected thereto so that rotation of the bar moves the shoes toward and away from each other, the expansion means further including locknuts engagable with each shoe to prevent unwanted movement of the shoes, the locknuts being threadedly engaged with the threaded bar.

2. The tire chock for tandem wheels of claim 1 wherein the expansion means further includes a locknut engagable with each shoe to prevent unwanted movement of the shoes, the locknuts being threadedly engaged with the threaded bar.

* * * * *